April 4, 1967 R. T. BURNETT 3,312,316
DISC BRAKE ADJUSTER
Original Filed Oct. 20, 1960 7 Sheets-Sheet 1

FIG. 1

INVENTOR.
RICHARD T. BURNETT.
BY
ATTORNEY.

FIG_3

FIG_4

April 4, 1967 R. T. BURNETT 3,312,316
DISC BRAKE ADJUSTER

Original Filed Oct. 20, 1960 7 Sheets-Sheet 4

INVENTOR.
RICHARD T. BURNETT.
BY Cecil f aseng

ATTORNEY.

INVENTOR.
RICHARD T. BURNETT.
BY
ATTORNEY.

United States Patent Office 3,312,316
Patented Apr. 4, 1967

3,312,316
DISC BRAKE ADJUSTER
Richard T. Burnett, South Bend, Ind., assignor to The Bendix Corporation, South Bend, Ind., a corporation of Delaware
Original application Oct. 20, 1960, Ser. No. 63,894, now Patent No. 3,134,459, dated May 26, 1964. Divided and this application June 28, 1963, Ser. No. 291,544
3 Claims. (Cl. 188—196)

This application is a division of U.S. application Ser. No. 63,894, filed on Oct. 20, 1960, now Patent No. 3,134,459.

This invention relates to a brake and more particularly to a disc brake which is particularly adapted to meet the braking requirements of road vehicles.

Disc brakes offer an advantage over shoe type brakes in being more controllable and more fade resistant and for that reason are becoming more in demand in the automotive field as limitations of the shoe type brake are being approached.

One of the objects of this invention is to provide an improved automatic adjuster.

A further object of the invention is to provide the automatic adjuster with a "kick-back" feature permitting a friction member to yield when the rotor deflects the same beyond a normal amount and which restores the friction member to its normal position after deflection by the rotor.

Other objects and features of the invention will become apparent from a consideration of the following description which proceeds with reference to the accompanying drawings, wherein.

Referring now to the embodiment shown in FIGURES 1-7 a rotor 20 is mounted for rotation on a rotatable part of the vehicle such as an axle flange (not shown) and includes oppositely facing braking surfaces 22 and 24. A nonrotatable braking structure, designated generally by reference numeral 26 effects retarding force on rotation of the rotor 20 to stop the vehicle. The nonrotatable braking structure 26 is mounted on a combination mounting and torque resisting member 28 having a radially inner portion 30 with openings 32 adapted for mounting the torque resisting member 28 against rotation. Torque resisting member 28 extends alongside braking surface 22 of the rotor, is spaced therefrom, and terminates in a transverse flange 34 which is disposed beyond the outer periphery of the rotor and may include ribs 36 or the like to rigidify the flange 34. The torque resisting member 28 has lugs 38 and 40 (FIGURES 3, 4 and 5) which are constructed integrally with the torque resisting member 28 and are disposed in one plane of the torque taking member and another set of lugs 42 and 44 which are disposed beyond the outer periphery of the rotor and are in a plane transverse to the plane of lugs 38 and 40. Lugs 38, 40, 42 and 44 provide a supporting structure for the structure brake 26 which is free to move angularly in a plane normal to the planes of rotor surfaces 22 and 24 align itself with the braking surfaces 22 and 24. The transverse flange 34 also provides convexly curved anchoring surfaces 46 and 48 upon which the nonrotatable brake structure is free to move angularly in order to conform with the opposite braking surfaces 22 and 24 of the rotor. The nonrotatable portion of the brake which is supported on the torque resisting member 28 is, in effect, a cage which is made up of two stirrups or yoke members 50, 52 having legs which encompass the rotor and are spaced sufficiently apart to permit rotation of the rotor 20 therebetween. A friction pad 54 which is clamped to two of the legs of the yoke members 50, 52 at one side of the rotor 20 makes up a third side of the cage, and a housing 56 is clamped by bolts 59 to the legs of the yoke members at the other side of the rotor and makes up the fourth side of the cage which thus extends over a sector of the rotor 20 and is supported for both axial and angular movement relatively to the rotor. Friction pad 60, which is not part of the cage, is slidably supported at its opposite ends on the yoke members 50 and 52 which form two of the sides of the cage.

The rigid four sided cage structure although free to move axially (normally to the plane of the braking surfaces 22 and 24) and angularly on the anchoring surfaces 46 and 48 is constrained against moving circumferentially with the rotor because of the abutment of yoke members 50, 52 on anchoring surfaces 46, 48 on member 28 while the slots 62 and 64 in yoke members 50 and 52 which receive lugs 38 and 40 and the slots 66 and 68 which receive lugs 42 and 44 are proportioned to permit axial sliding movement of the cage (FIGURE 4) toward and away from the rotor surfaces 22 and 24, and pivotal motion in a plane normal to the rotor. Circumferential movement of the cage is prevented by engagement of the yoke members 50, 52 with anchoring surfaces 46 and 48.

The friction pad 54 at side 24 of the rotor consists of a backing 70 with turned back flanges 72 and 74 having bolt connections 76 and 78 with yoke members 50 and 52 and lugs 80, 81 which project through slots in the yokes 50 and 52 to prevent turning of the friction pad 54 about its bolt mountings 76 and 78 and to transfer applying forces from yoke members 50 and 52 directly to friction pad 54.

Figure 1:
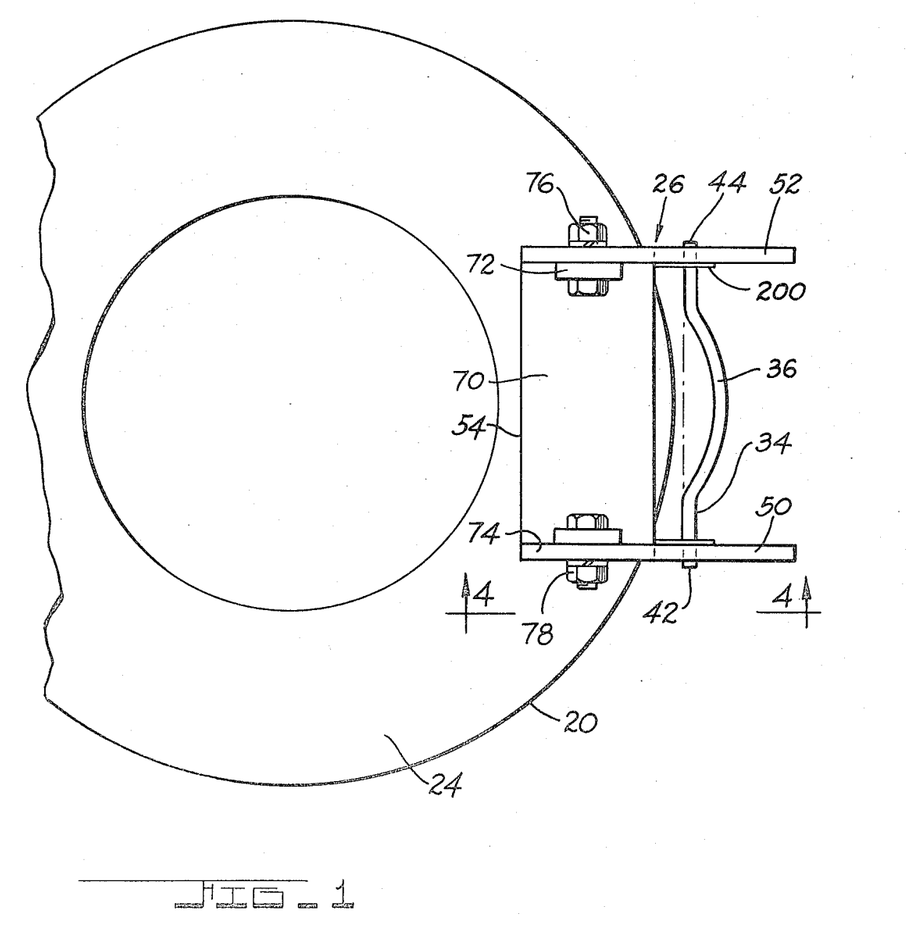
FIGURE 1 is a side elevation view of the outboard side of the brake as it is installed on the left front wheel of an automobile, the brake rotor being shown in fragmentary view.
Figure 2:
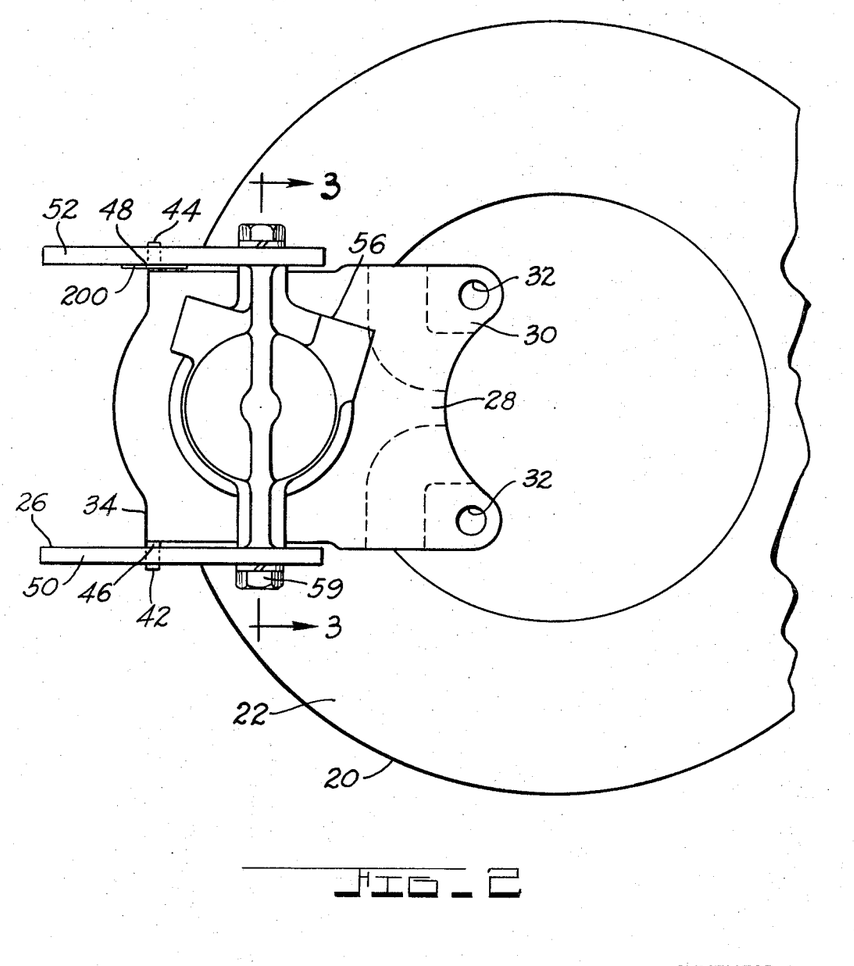
FIGURE 2 indicates the inboard side of the brake which is the opposite side of the structure shown in FIGURE 1 and illustrating the mounting for the brake.
Figure 3:
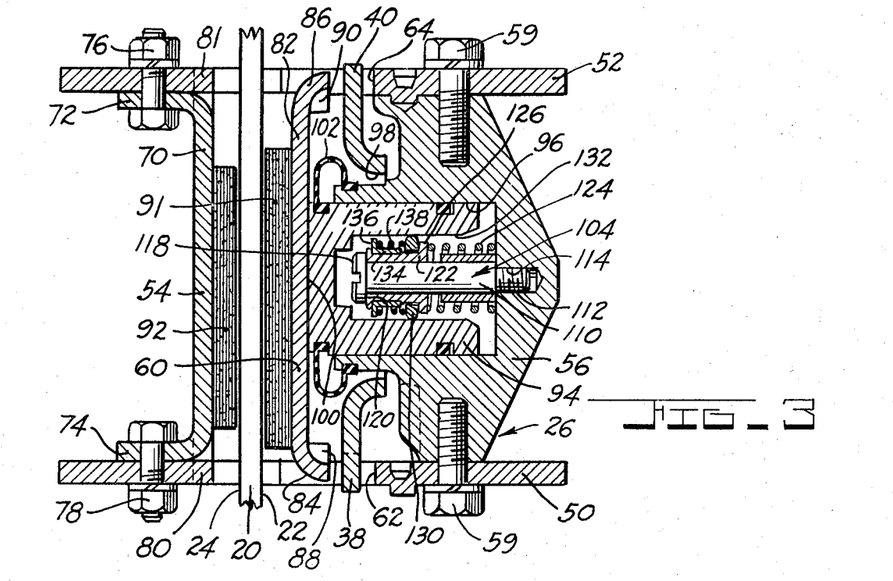
FIGURE 3 is a section view taken on the line 3—3 of FIGURE 2.

The other friction pad 60 has a backing 82 with end flanges 84 and 86 slidably mounted in slots 62 and 64 of the yoke members and turned back flanges 88 and 90 which anchor against the inner surfaces of the yoke members 50, 52 (FIGURE 3). Both friction pads 54 and 60 are suitably faced with friction material 91 and 92 which engages the opposing surfaces 22 and 24 of the rotor.

The brake is actuated by a piston 94 which is slidably received in cylinder bore 96 of the housing 56, both the housing and the piston extending through an opening 98 in the torque resisting structure 28. It will be noted that the piston is guided closely adjacent its surface of engagement 100 with the friction pad 60 to prevent cocking of the piston within cylinder bore 96. The interior of the fluid motor is sealed by the usual flexible boot 102 connected with both the piston 94 and housing 56 to prevent entry of dirt and other contaminants.

The housing 56 has in its interior, a combination adjuster and retracting means 104 which is intended to provide a clearance with respect to the rotor of the friction members 54 and 60 and at the same time permit recoil and restoring movement of the friction members away from and toward their normal released position to compensate for movement of the rotor to the right in FIGURE 3. Mechanism 104 comprises a stem 110 having a threaded end 112 which is received within the threaded opening 114 of the housing 56 and has a slotted end 118 which enables turning of the stem 110 and provides a shoulder 120 against which sleeve 122 is thrust by a preloaded spring 124 compressed against flange 126 of the sleeve 122 and the closed end of cylinder bore 96. A soft iron ring 130 which is about twenty thousandths oversize in relation to the opening 132 is forced within the opening 132 and relative movement is resisted between the soft ring 130 and the piston 94, it taking approximately 50 pounds force to produce relative movement therebetween. The oversize relation of the ring 130 insures that it will be compressed beyond its elastic limit when squeezed within the opening 132 and the resulting normal force between the ring 130 and opening 132 is substantially the same regardless of the amount of deformation providing the deformation is beyond the elastic limit of the ring 130. Thus it is possible to achieve within nominal manufacturing tolerances a substantially consistent normal force between the ring 130 and opening 132 and consequently a substantially constant resistance force to movement of piston 94 on its adjusting movement. This is a significant achievement because where the same effect to be obtained by carefully making parts to achieve an interference fit within elastic limits of the parts the manufacturing tolerances would be at least 10 times as great adding considerably to the cost of manufacture.

It is also necessary to provide that the ring 130 be ductile so as not to fracture while undergoing its deformation. One material suitable for the described function of ring 130 is low carbon steel having less than 0.100% carbon. The normal force between the ring 130 and opening 132 is greater than the force of either of springs 124 and 138. There is about twenty thousandths clearance between ring 130 and a second sleeve 134 which has a flange 136 and spring 138 compressed between the flange 136 and the ring 130. Pedal travel is not lost by road jars because, assuming that road shock has caused the rotor 20 to move toward the right beyond the running clearance between the rotor surface 22 and friction pad 60, the friction pad 60 will be displaced toward the right pushing the piston 94 also toward the right and with it the ring 130 which displaces the sleeve 122 toward the right against the resistance of spring 124; thus, when the rotor 20 is restored to its original position the spring 124 will bias the sleeve 122, ring 130, and piston 94 toward the left and returning the friction pad 60 therewith so that the original running clearance between the pad 60 and rotor surface 22 is not lost. Assuming that road shock caused rotor deflection to the left beyond the running clearance between friction pad 54 and surface 24 of the rotor, the friction pad 54 is displaced toward the left moving the cage therewith including the housing 56 and compressing the spring 124 against the axially fixed flange 126, the flange 126 being held by the stem 110. In this case, when the rotor returns to its normal position, the spring 124 acting through the cage, causes the friction pad 54 to move toward the right and follow-up rotor movement so that the running clearance between pad 54 and side 24 of the rotor is not lost.

The device 104 also acts as an automatic adjuster during actuation of the brake and is operative by movement of the piston 94 leftwardly in FIGURE 3. Should applying movement of the piston 94 exceed the running clearance between the ring 130 and adjacent end of the sleeve 134, the actuating force will overcome the 50 pounds resistance to sliding movement between the ring 130 and opening 132 and the piston 94 will move leftwardly (FIGURE 3) relatively to the ring 130 which has compressed the spring 138 in moving through its limited motion clearance with the end of sleeve 134. When the brake applying force on the piston 94 is relieved the spring 138 forces the ring 130 toward the right and the ring carries the piston 94 therewith until the ring 130 is moved through .030 inch and into engagement with the flange 126 of sleeve 122. The device 104 thus functions both to adjust the two friction pads and also to prevent loss of their proper running clearance because of road shocks which temporarily displace the rotor to the right or to the left.

*Brake Operation*

In operation, fluid pressure which is developed by the operator through a pedal or the like is communicated to the piston 94 which is biased leftwardly (FIGURE 3) pressing the friction pad 60 against surface 22 of the rotor, the friction pad moving slidably on its lugs 84 and 86 which are mounted in slots 62 and 64. Hydraulic reaction force urges the housing 56 toward the right thus displacing the cage (two sides of which are the yokes 50 and 52) toward the right and thereby pressing friction pad 54 against surface 24 of the rotor. The described rightward movement of the cage in FIGURE 3 is obtained by virtue of the slidable connections formed between lugs 38, 40 and lugs 42, 44 in the torque resisting member 28 and their companion notches 62, 64, 66 and 68 in yokes 50 and 52.

Figure 4:
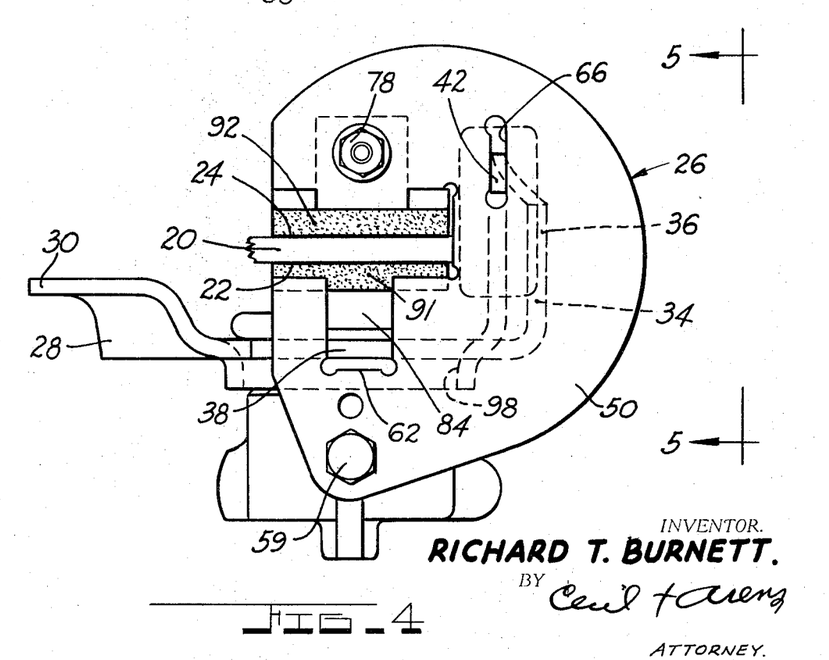
FIGURE 4 is an end view of the brake looking in the direction of the arrows 4—4 in FIGURE 1.
Figure 5:
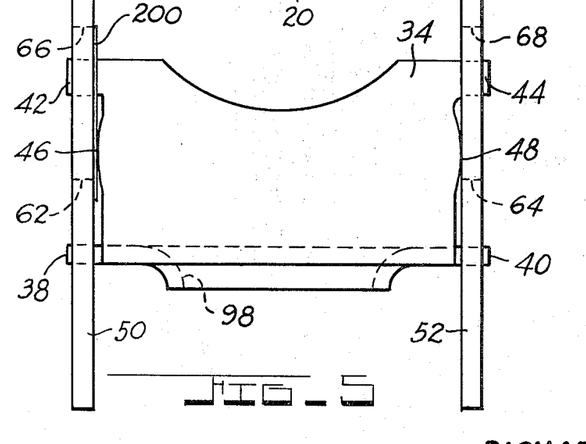
FIGURE 5 illustrates a partial view of the brake looking in the direction of the arrows 5—5 in FIGURE 4 and illustrating the mounting and yoke members.
Figure 6:
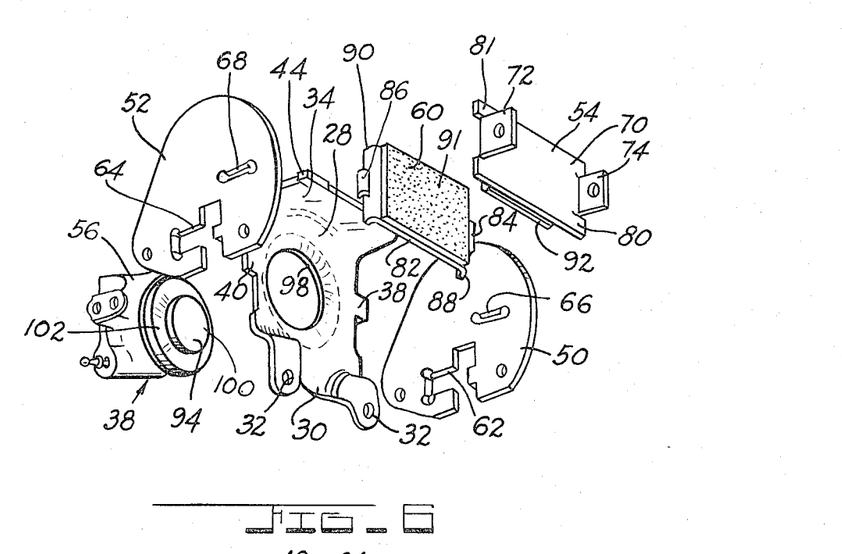
FIGURE 6 is a perspective exploded view of the brake with the rotor removed.
Figure 7:
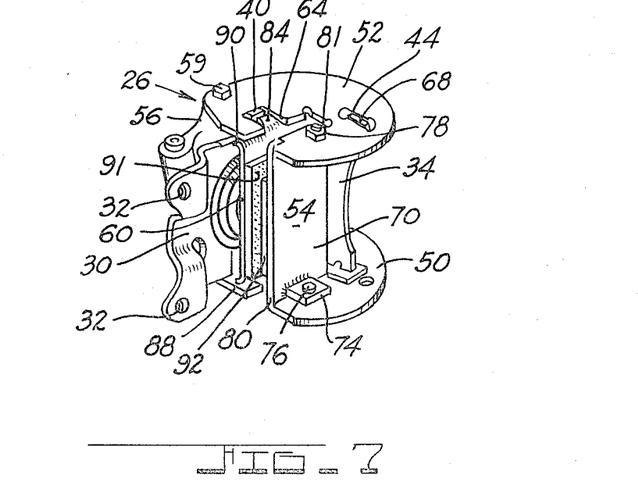
FIGURE 7 is a perspective view of an assembled brake shown after the parts are joined in FIGURE 6.
Figure 8:
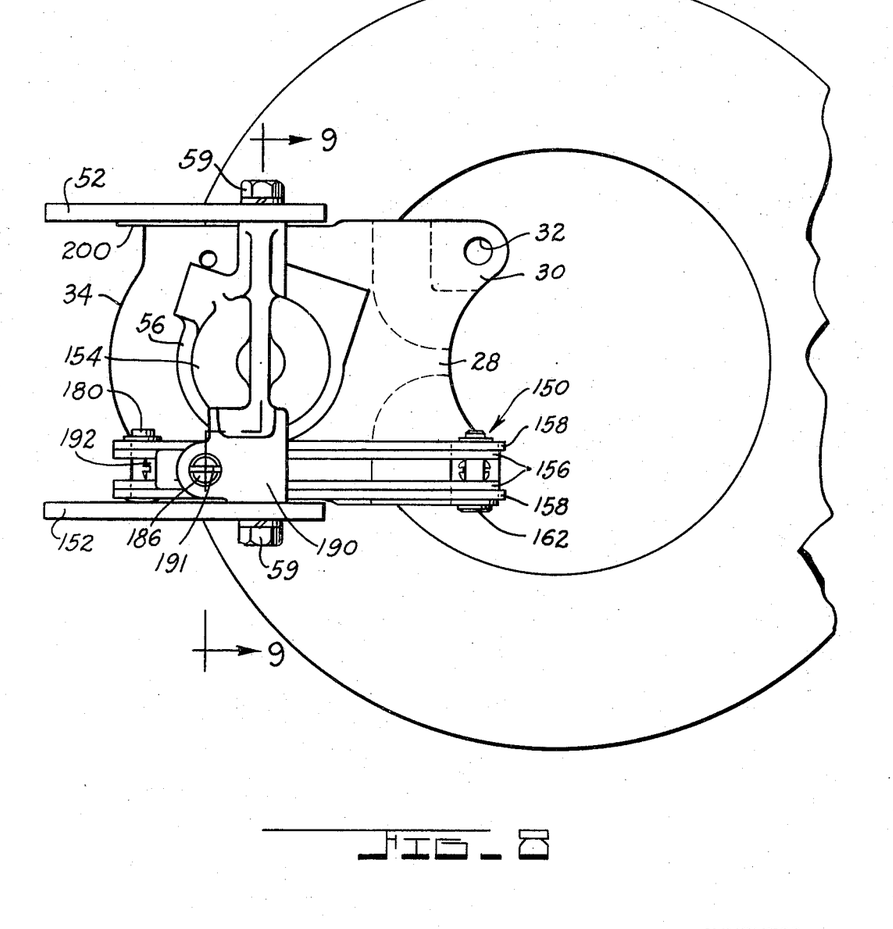
FIGURE 8 is a side elevation view of the brake as it is adapted for the rear wheel brakes and including the parking brake construction, the view being taken at the inboard side of the left rear wheel.
Figure 9:
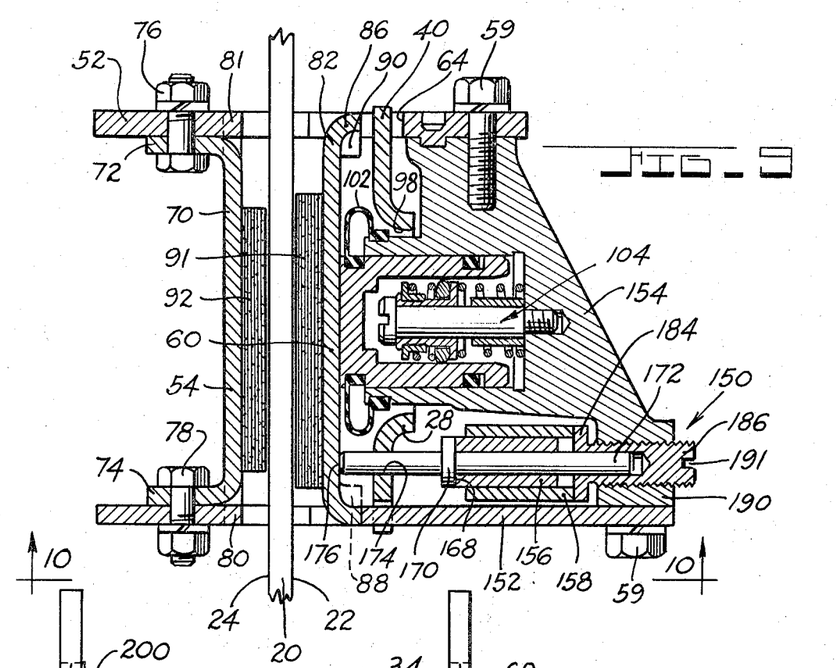
FIGURE 9 is a section view taken on the line 9—9 of FIGURE 8.
Figure 10:
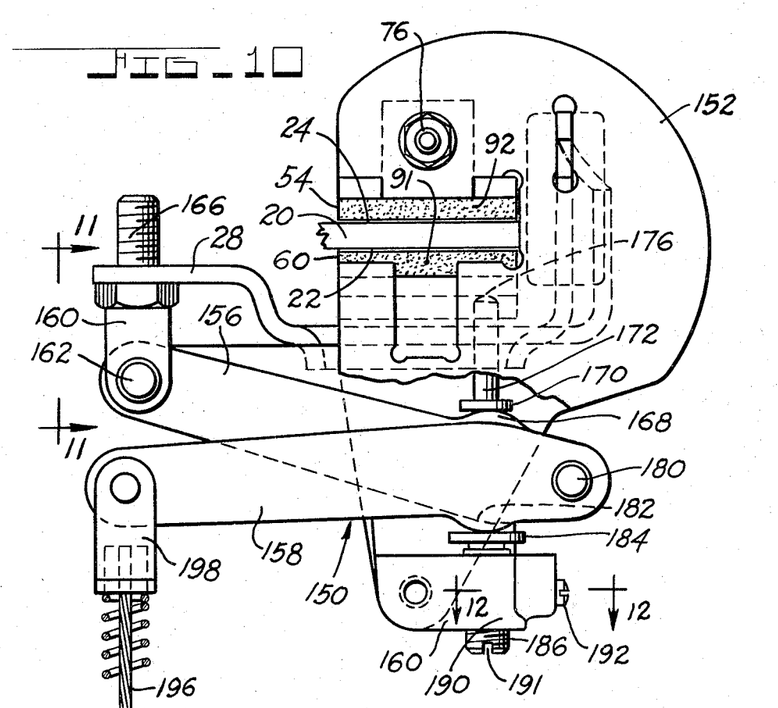
FIGURE 10 is an end view of the brake looking in the direction of the arrows 10—10 in FIGURE 9.

The braking force from engagement of the friction pads 54 and 60 with the rotor is transmitted to the two yokes 50 and 52, the friction pad 54 transmitting its tangential anchoring load to the yokes through bolted connections 76 and 78 and the friction pad 60 transmitting its tangential braking load through flanges 88 and 90 and the braking force is then transmitted through the yokes to one or the other of the convexly curved anchoring surfaces 46 or 48 of the torque resisting member 28 (FIGURE 5) in the center plane of the rotor 20. Although the cage is a rigid structure, it is free to tilt angularly in a plane which is normal to the braking surfaces 22 and 24 of the rotor (FIGURE 4). This angular movement is permitted because the yoke members can move back and forth by reason of the oversize slots which can move back and forth in relation to the lugs 38, 40, 42 and 44 thus enabling the friction pads to conform with the opposing surface of the rotor. The described angular movement is also permitted because the surface of the yokes which engages rounded anchoring surfaces on the flange 34 enables the friction pads to adjust themselves to any irregularity in the opposing surfaces in the rotor. In this manner evenness of wear of the friction pads is ensured and the braking work is distributed in the same proportion between the respective friction pads. Because the point at which the anchoring thrust is transferred from the yoke members to the fixed structure 28 is located coplanar with the rotor (FIGURE 5) the anchoring load does not impose any twisting force on the cage tending to apply either friction pad by an unequal amount. In other words, the friction pads are free to adjust themselves angularly to obtain full conformity with the opposing rotor surface and the anchoring load will not itself contribute to positioning of the cage and interfere with its proper angular location.

When the brake is released, the spring 138 acting through the ring 130 urges piston 94 toward the right and, acting through the stem 110 urges housing 58 and remaining portion of the cage toward the left thus relieving the applying force on the friction pads and permitting their retraction by the desired amount.

Referring next to the rear wheel brake embodiment which is shown in FIGURES 8–12, the rear wheel brake includes a mechanical actuator designated generally by reference numeral 150 for applying the friction pad which is in addition to the hydraulic actuator. In this embodiment, the structure is essentially the same as described in the previous embodiment except that the yoke 152 and housing 154 are enlarged to accommodate the mechanical actuator which comprises two sets of levers 156 and 158. The lever set 156 (FIGURES 10 and 11) is mounted for turning movement on bracket 160 through pin 162, and the bracket is fastened to the mounting structure 28 by means of a screw 164 and bolt 166.

The lever set 156 has rounded convexly shaped thrust surfaces 168 in engagement with shoulder 170 of the thrust pin 172 which pass through opening 174 in the mounting structure 28 (FIGURE 9) and bears at its end 176 against the friction pad 60.

Figure 11:
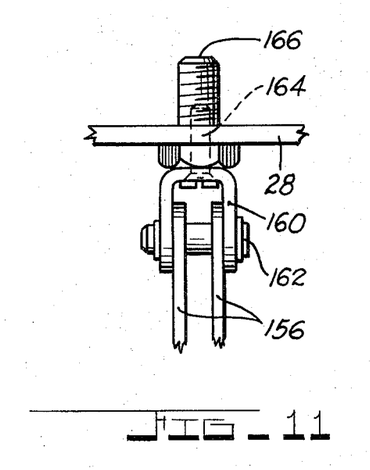
FIGURE 11 is an enlarged detail view of the mounting for the brake actuator looking in the direction of the arrows 11—11 in FIGURE 9.
Figure 12:
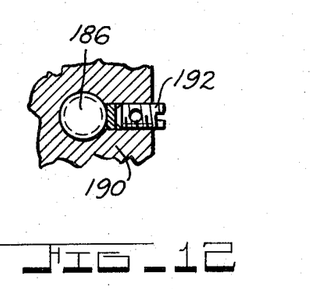
FIGURE 12 is a fragmentary sectional view of the locking means used in connection with the adjuster for the mechanical actuator.

The two sets of levers 156 and 158 have an articulated linkage connection 180 through which force is transmitted between the two levers and the lever set 158 fulcrums on rounded convexly shaped surfaces 182 which bear against head 184 of adjuster screw 186. The adjusting screw is mounted threadably in boss 190 of housing 154 and is locked in place by a set screw 192 (FIGURE 11). The threaded stem 186 has a slot 191 by which it can be turned for adjustment of the mechanical actuator and thereafter set screw 192 is turned to lock the screw 186 at its appropriate position. Adjustment of the mechanical actuator 150 compensates for wear of the friction pads and prevents excessive applying movement of the actuator when the wear pad clearance is excessive.

To apply the brake mechanically, pulling force is exerted through cable 196 and clevis 198 to lever set 158 which pivots on articulated connection 180 and communicates thrust through its rounded surfaces 182 to the stem 186 (FIGURE 10) and housing 154 whereby the cage is drawn toward the right (FIGURE 9) pressing friction pad 54 against surface 24 of the rotor 20. When further mopement of the cage toward the right is prevented by engagement of the friction pad 54 with surface 24, the lever set 158 fulcrums on its convexly shaped surfaces 184 and acting through articulated connection 180, causes the lever set 156 to pivot on its pin connection 162 with bracket 160 so that lever set 156 acts through its convexly shaped surfaces 168 to effect leftward applying movement of the thrust rod 172 (FIGURE 9) thereby applying friction pad 60. The applying forces on the friction pads 54 and 60 are approximately the same to obtain maximum braking efficiency. The mechanical actuator 150 in no way impedes the efficiency of the hydraulic actuator which functions identically with the previous embodiment and the hydraulic actuator in turn has no effect whatever on the mechanical actuator, each actuating means being independently operable to apply the friction pads 54 and 60 against the rotor.

In some instances it is found advisable to insert a leaf spring 200 between one of the yoke members and the mounting member (FIGURES 1, 2, 5 and 8) to minimize brake noise. It has been found that the leaf spring 200 of this sort tends to cushion takeup in the brake parts which occurs during brake application and also tends to cushion vibrations which give rise to brake noises that are of various sorts such as are commonly found in all brakes.

Although the present invention has been illustrated in connection with a single example embodiment, it will be understood that this example is in no way restrictive of the invention. It is reasonable to be expected that those skilled in the art can make numerous revisions and adaptations of the invention that suit individual design preferences. It is intended that such revisions and adaptations as incorporate the herein disclosed principles will be included within the scope of the following claims as equivalents of the invention.

I claim:
1. An automatic adjusting device for a brake comprising a housing having a cylinder therein with one end of said cylinder being open, a fluid operated piston disposed in said cylinder for movement through the open end of said cylinder, said piston being closed across its diameter adjacent said open end, a cylindrical axially extending recess in said piston opening into said cylinder and disposed opposite the closed end of the piston, an axially extending pin fixed at one end to said housing and having its other end extending into said axial recess, an annular block of friction material completely enclosed within said axial recess and encircling said pin and in frictional engagement with the circumference of said axial recess, said friction means being movable axially relative to said pin and piston, and biasing means mounted on said pin and completely enclosed within said axial recess for normally urging said friction means in an axial direction away from the open end of said cylinder.

2. In a brake or the like, a cylinder housing having a bore therein open at the forward end and closed at the rear end, a piston slidable in said bore and having a recess opening into the rear face thereof, an element having a central opening therein, an elongated member extending in an axial direction of said bore through said central opening into said piston recess, a pair of axially spaced abutments located on said elongated member, said element being located between said abutments for engagement therewith and gripping said piston, the rearwardmost abutment being movable relative to and surrounding said elongated member, stop means located on said elongated member, first resilient means biasing said rearwardmost abutment forwardly into engagement with rearwardmost said stop means, second resilient means of lesser force than said first resilient means, said second resilient means biasing said piston rearwardly and biasing said element rearwardly into engagement with said rearwardmost abutment, said rearwardmost abutment when biased against said stop means defining the retracted position of said piston relative to said elongated member, the dimensions of said element and the axial space between said abutments providing a clearance for movement of said element therebetween, whereby upon brake application said piston and said element will move forwardly as a unit until said element engages the forwardmost abutment and thereafter said piston will move forwardly relative to said element to provide a new gripping position of said element on said piston, said piston, said element and said rearwardmost abutment moving rearwardly as a unit against the force of said first resilient means when when said piston is deflected rearwardly beyond the retracted position of said piston.

3. In a brake or the like, a cylinder housing having a bore therein open at the forward end and closed at the rear end, a piston slidable in said bore and having a recess opening into the rear face thereof, an element having a central opening therein, an elongated member extending in an axial direction of said bore through said central opening into said piston recess, a pair of axially spaced abutments located on said elongated member, said element being located between said abutments for engagement therewith and gripping said piston, the rearwardmost of said abutments being movable relative to said elongated member, stop means located on said elongated member, resilient means biasing said rearwardmost abutment forwardly into engagement with said stop means, said rearwardmost abutment when biased against said stop means and engaged by said elements, defining a retracted position of said piston relative to said elongated member, the dimensions of said element and the axial space between said abutment members providing a clearance for movement of said element therebetween, whereby upon brake application said piston and said element will move forwardly as a unit until said element engages the forwardmost abutment and thereafter said piston will move forwardly relative to said element to provide a new gripping position of said element on said piston, said piston, said element and said rearward abutment moving rearwardly as a unit against the force of said resilient means when said piston is deflected rearwardly beyond said retracted position of said piston, and resilient means of lesser force than said first resilient means for biasing said piston into retracted position.

No references cited.

DUANE A. REGER, *Primary Examiner.*